March 16, 1926.
W. WESTBURY
1,577,008
GLASS DRAWING APPARATUS
Original Filed May 12, 1922   2 Sheets-Sheet 1
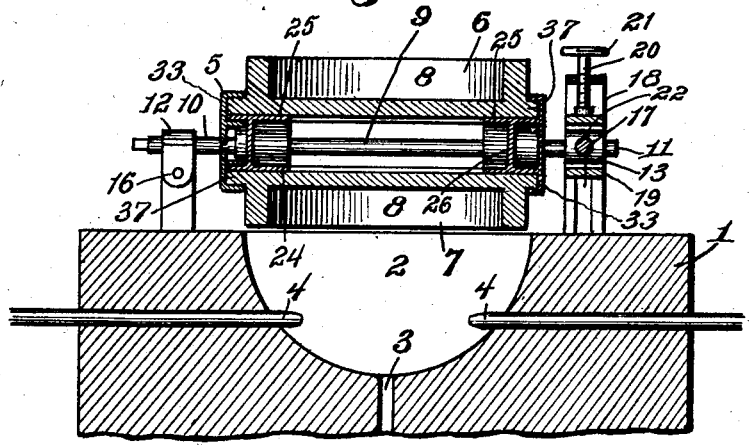
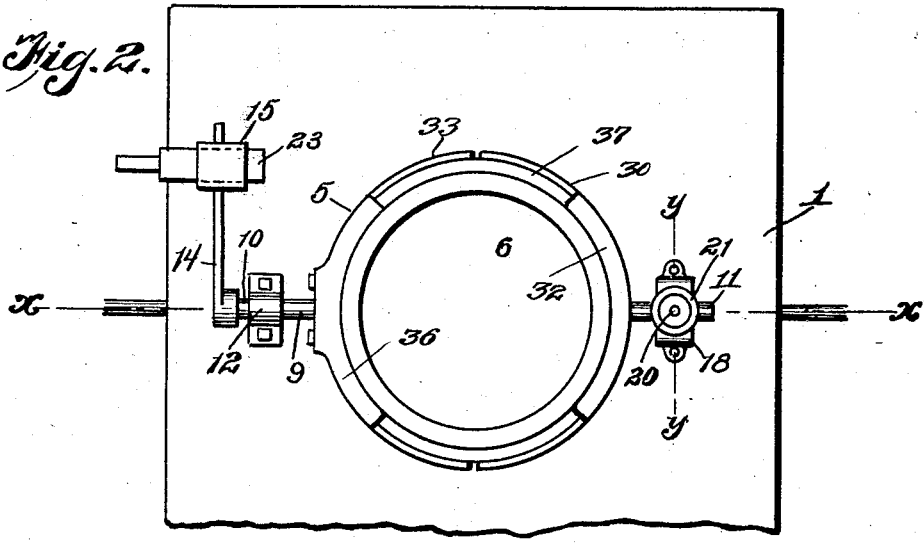
Inventor:
William Westbury,
By C. C. Hines,
Attorney.

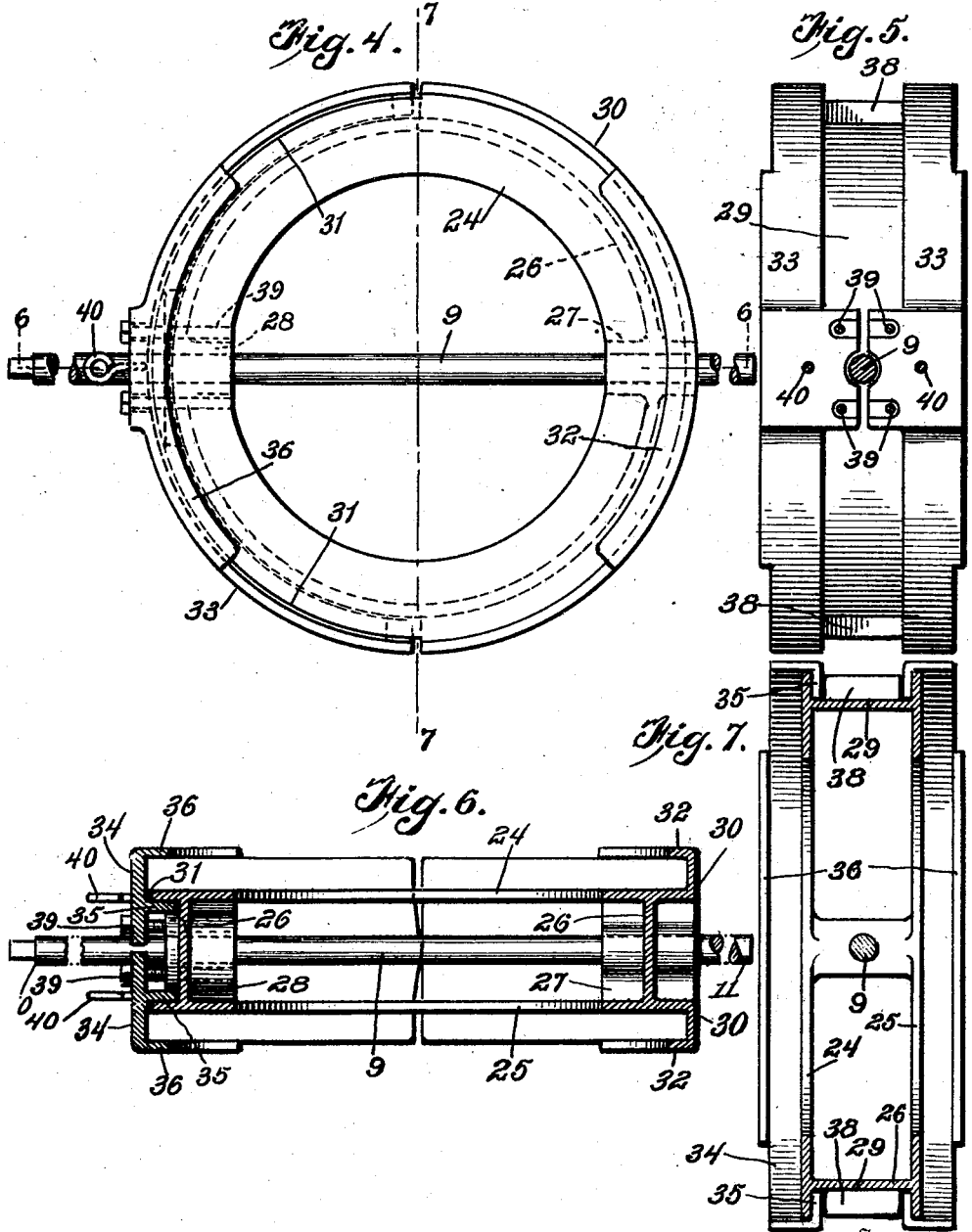

Patented Mar. 16, 1926.

1,577,008

UNITED STATES PATENT OFFICE.

WILLIAM WESTBURY, OF INDEPENDENCE, KANSAS, ASSIGNOR, BY MESNE ASSIGNMENTS, TO HARDING GLASS COMPANY, OF FORT SMITH, ARKANSAS, A CORPORATION OF WEST VIRGINIA.

GLASS-DRAWING APPARATUS.

Application filed May 12, 1922, Serial No. 560,435. Renewed January 21, 1926.

*To all whom it may concern:*

Be it known that I, WILLIAM WESTBURY, a citizen of the United States, residing at Independence, in the county of Montgomery and State of Kansas, have invented new and useful Improvements in Glass-Drawing Apparatus, of which the following is a specification.

This invention relates to glass drawing apparatus, and particularly to glass drawing apparatus of that type for drawing glass cylinders embodying a reversible pot operatively mounted with relation to a melting kiln for heating a reversed pot to melt the aftermath for drainage therefrom.

One object of my invention is to provide a reversible pot which is adapted to be readily applied to its supporting frame and as readily removed therefrom for convenience in making repairs or the substitution of a new pot for a damaged one.

A still further object of the invention is to provide a double reversible pot and a supporting frame therefor so constructed as to firmly clamp the pot members in applied position while admitting of their separate or joint application and removal at any time as occasion may require.

A still further object of the invention is to provide a novel construction of melting furnace and reversible pot so combined and arranged as to enable the pot to be reversed without the necessity of using a carriage shift, or a movable top stone, or of bodily raising the pot out of the furnace in order to enable it to be reversed.

In the accompanying drawings illustrating my invention,—

Figure 1 is a vertical section through a melting kiln and reversible pot embodying my invention, the section being taken on the plane indicated by the line *x—x* in Figure 2.

Figure 2 is a top plan view of the kiln and pot.

Figure 3 is a detail section on the line *y—y* of Figure 2.

Figure 4 is a top plan view of the pot supporting frame per se.

Figure 5 is a view looking toward one side thereof.

Figure 6 is a sectional view through the pot supporting frame on the line 6—6 of Figure 4.

Figure 7 is a sectional view on the line 7—7 of Figure 4.

Referring to the drawings, 1 designates a melting kiln or furnace having a melting chamber 2 of approximately hemispherical form, which chamber is provided at its bottom with the usual eye or outlet 3 for the discharge of the melted glass refuse or aftermath from the pot. One or more gas burners 4 are provided for heating the chamber 2 and bottom of the inverted pot from which the aftermath is to melted in a well known manner.

Mounted upon the furnace structure is a pot supporting frame 5, carrying a pair of reversely disposed pots 6 and 7 having their bottom portions arranged in apposition, and having their glass receiving chambers or cavities 8 facing in diametrically opposite directions, the arrangement being such that when the pot 6 is in drawing position the pot 7 will be in draining position, and vice versa. The said pot supporting frame, which is of novel construction and hereinafter fully described, is mounted upon a shaft 9 having end portions or journals 10 and 11 projecting at opposite sides of the pot structure, said journals being mounted respectively in bearings 12 and 13. The end 10 of the shaft has attached thereto an operating lever 14 provided with a counterweight 15, which counterweight substantially balances the weight of the pot structure and adapts it to be readily and conveniently tilted in one vertical plane on the shaft 9 as an axis of motion.

The bearings 12 and 13 are specially mounted to enable the pot to be also tilted in another vertical plane at an angle to its plane of motion on the shaft 9, and as herein shown in a plane at right angles to its plane of motion on said shaft 9. To this end the bearing 12 is pivotally mounted, as at 16, to adapt the end 10 of the shaft 9 to tilt vertically on such pivotal connection, while the bearing 13 is vertically movable and adjustable in a guideway 17 formed in a guide member 18 to permit the end 11 of the shaft to be raised and lowered to effect a tilting adjustment of the shaft end 10 on the pivotal connection 16. In the particular construction illustrated, the bearing 13 is carried by a vertically movable yoke 19 to which is swiveled the lower end of an adjusting screw 20 mounted in the guide member 18 and provided at its upper end with a hand wheel 21 by means of which it may be turned in one direction or the other to raise the yoke 10 and, consequently, the bearing 13. By vertically adjusting the bearing 13 it will be evident that the pot may be tilted vertically along a line arranged at right angles to the axial line of the shaft 9. In order to adapt the end 11 of the shaft to accommodate itself to its angles of adjustment the bearing 13 is provided with trunnions 22 adapting it to turn upon the yoke 19, as will be readily understood.

In practice the mouth or open end of the chamber 2 is of slightly greater diameter than the diameter of the pots 6 and 7, and the shaft 9 is supported at such an elevation that the rim edge of the bottom or reversed pot, as shown by the pot 7 in Figure 1, lies close to and at a slight elevation above the top of the chamber 2, the arrangement being such that when the pot structure is reversed to move one pot into and the other out of drawing position, in an arc of movement of 90°, the bottom of the pot structure will swing free and clear of the kiln and without interference therefrom. The bottom pot will thus be disposed in reversed or drainage position immediately above the chamber 2 and will to a large extent close said chamber and lie immediately within the zone of the heat and flames from the burners 4, while at the same time the pot is so mounted that it may be reversed without any other than a simple 90° movement on its shaft or axis 9. By this means I obtain a reliable and efficient reversing action and disposal of the inverted pot member in proper drainage position, without the necessity of raising and lowering the pot for reversing actions as is required with many structures, or of using a carriage shift for moving the pot into and out of drainage position, or of employing a movable top stone and means for shifting the same into and out of operative position.

The pot structure as above described is adapted for general uses in drawing glass cylinders, with the special advantages named over prior pot devices in common use, and it is further adapted for drawing glass cylinders in the manner set forth in my copending application, filed May 12, 1922, Serial No. 560,434, wherein certain adjustments of the pot structure are described for correcting deficiencies in drawing actions preventing the drawing of thick and thin cylinders. In accordance with the method set forth in said application, Serial No. 560,434, the pot may be tilted in one general direction on the shaft 9 as an axis to effect a centering of the cylinder with relation to the glass charge in such general direction, and it may also be tilted on the shaft 16 by means of the hand screw 20 in another general direction, at an angle to the first-named general direction, for centering the cylinder with relation to the charge of glass in the second-named general direction. As however, the structure for this purpose forms no part of this invention, and simply described to make the general showing clear, I have not deemed it necessary herein to enter into a detailed discussion of such adjustments, as the same are particularly set forth and claimed in my aforesaid application Serial No. 560,434, and as the present invention relates particularly to the relative construction and arrangement of the kiln and pot structure and the construction of the pot frame per se. It may be stated, however, that the pot is reversed by hand adjustment through the medium of the hand lever 14, whereby the pot is swung on the axis 9, and that a supporting and adjusting wedge 23, which may be interposed between the lever 14 and the top of the furnace body at either side thereof, is employed to enable the pot to be tiltably adjusted on the axis 9 for centering the pot and carrying out corrective adjustments in this general direction of movement of the pot structure.

The pot carrying frame 5 comprises, as shown, a pair of concentrically disposed and normally horizontal ring plates 24 and 25, united by a vertically disposed annular web 26, said ring plates and web being cast integral with each other and with collars or sleeves 27 and 28 provided for the passage of the ends of the shaft 9, which extend through and are suitably secured in said collars or sleeves. The outer edges of the ring plates 24 and 25 extend outwardly beyond the line of the web 26 and form an annular channel 29 around the frame body. Extending around one half of the margin of the frame, or that portion of the frame of which collar 27 forms a complemental part, are marginal retaining flanges 30, while around the remaining half of the frame, of which the collar 28 forms a complemental part, these flanges are omitted and the marginal edge of the ring plates 24 partially cut away, as indicated at 31. The flanges 30 form, in conjunction with inwardly extending retaining lips 32 on the flanges 30, fixed retaining and clamping means at one side of the pot frame for engaging and holding the pots 6 and 7 in position, and a removable clamping member 33 is provided at the opposite side of the frame for cooperation with said fixed clamping means to clamp the pots in position therebetween.

The removable clamping member 33 comprises a vertically disposed semi-circular plate 34 having guide webs 35 to extend into the channel 29 and to guide the removable clamping member into engaging position and hold it firmly in engaging position. The plate 34 has its marginal edges extending beyond the outer faces of the ring plates 24 and 25, with its ends in alinement with the ends of the flanges 30 and forms when applied, with said flanges 30, pot retaining flanges extending around the outside of the rim frame to bear against the side walls of the pot and hold the same from lateral displacement. Lips 36 similar to lips 32, are provided upon the plate 34, diametrically opposite said lips 32, and the sets of lips 32 and 36 serve as clamping members to engage over flanges 37 projecting from the sides of the pots 6 and 7, whereby the bottom walls of the pots are clamped securely against the faces of the ring plates 24 and 25 to fasten said pots in an absolutely secure manner to the carrying frame. Lugs 38 are provided in the channel 29 in line with the ends of the cut away portions 31 to center the guide webs 35 in said channel adjacent to the ends of the flanges 30 and prevent the removable member 33 from tilting or canting. The collar 28 is formed with threaded openings to receive screws 39 passing through the center of the plate 34, whereby the removable member 33 is detachably and adjustably secured in position. When these screws 39 are disconnected, the removable member 33 may be detached, thus withdrawing the lips 36 from engagement with the pot flanges 37 and permitting the pots to be slid out of engagement with the lips 32, whereupon the pots may be removed from the carrier frame. In applying a pot in position, it is raised upon the cooperating ring plate 24 or 25 and adjusted so as to slip one of its flanges under the lip 32 so that upon the fitting of the removable section in place, adjustment of the coacting lip 36 into engagement with the other flange 37 of the pot and the application of the screws 39 the pot will be clamped in position. By the use of a frame construction of the character described, and having the removable clamping section 33, it will be apparent that, in using a pair of reversible pots, the pots may be individually or simultaneously applied or removed in an easy, ready and convenient manner, thus providing in a simple way for the removal of a pot for repairs or other purposes and substitution of a new pot therefor. An eye or like element 40 may be provided upon the removable ring section above and below the shaft 9 to receive a hook or other tool by means of which, upon the disconnection of the screws 39, the removable section 33 may be drawn outwardly to released position.

From the foregoing description, taken in connection with the drawings, the construction and mode of operation of my improved reversible pot carrying frame will be readily understood and its advantages appreciated without a further and extended description, and it will be obvious that the device may be employed for supporting a single pot or a pair of pots at will. Such structure is adapted, as will be apparent to those versed in the art, to save considerable time and trouble in applying and removing pots. Other advantages due to the mode of mounting the pot with relation to the kiln have been fully set forth or will be apparent from the foregoing description.

Having thus fully described my invention, I claim:—

1. A drawing pot structure comprising a frame carrying a fixed pot clamping member and a removable pot clamping member, said members having flange engaging lips, a pot having a flange adapted to be engaged by said lips, and means for securing the removable pot clamping member in clamping position.

2. A drawing pot structure comprising a frame including an annular base plate having at one side a flange engaging lip, a removable section having a flange engaging lip disposed diametrically opposite the first named lip, a pot having a flange adapted to be engaged by said lips, and means for securing the removable section in clamping position.

3. A reversible drawing pot structure comprising a frame composed of a pair of opposed frame members, retaining lips carried by said frame members, a removable section having retaining lips for cooperation with the first-named lips on opposite sides of the pot frame, pots adapted to rest against the frame members, and having flanges to be engaged by said lips, and means for securing the removable frame member in clamping position.

4. A reversible drawing pot comprising a frame formed of a pair of opposed ring members, each ring member having at one side a flange provided with a retaining lip, a removable frame member having guide portions adapted to fit between said opposed frame members and provided with flanges having lips located diametrically opposite the first-named lips, means for retaining the removable clamping member in clamping position, and pots adapted to rest against the opposed frame members and having flanges to be engaged by said lips.

5. A reversible pot structure comprising a frame including a base plate having a flange extending substantially around one half of its margin, said flange having a pot retaining lip thereon, a removable member having a flange extending around the remainder of the margin of the base plate and provided with a coacting pot engaging lip, means for retaining said removable member in engaging position, and a pot having a flange to be engaged by said lips.

6. A reversible pot comprising a shaft, a frame mounted to tilt with said shaft and embodying a pair of opposed annular frame plates, said frame plates having flanges extending substantially around one half the margin thereof, said flanges having pot engaging lips, a removable frame section having flange guide portions projecting into the space between the annular frame members and having flanges extending around the unflanged portions of said annular frame plate, said removable frame section having oppositely extending flanges provided with pot engaging lips for cooperation with the first-named lips, pots adapted to rest against said annular frame members and having flanges to be engaged by the lips, and means for retaining the removable frame section in clamping position.

In testimony whereof I affix my signature.

WILLIAM WESTBURY.